(12) United States Patent
Dalal

(10) Patent No.: US 8,892,706 B1
(45) Date of Patent: Nov. 18, 2014

(54) PRIVATE ETHERNET OVERLAY NETWORKS OVER A SHARED ETHERNET IN A VIRTUAL ENVIRONMENT

(75) Inventor: Anupam Dalal, Mountain View, CA (US)

(73) Assignee: Vmware, Inc., Palo Alto, CA (US)

(*) Notice: Subject to any disclaimer, the term of this patent is extended or adjusted under 35 U.S.C. 154(b) by 441 days.

(21) Appl. No.: 12/819,438

(22) Filed: Jun. 21, 2010

(51) Int. Cl.
*G06F 15/177* (2006.01)

(52) U.S. Cl.
USPC ............................................ 709/223; 709/222

(58) Field of Classification Search
USPC .............. 709/200, 203, 220, 221, 222, 223; 711/6, 203; 718/1, 100
See application file for complete search history.

(56) References Cited

U.S. PATENT DOCUMENTS

| | | | | |
|---|---|---|---|---|
| 6,151,329 | A * | 11/2000 | Berrada et al. | 370/447 |
| 6,765,921 | B1 * | 7/2004 | Stacey et al. | 370/401 |
| 7,260,102 | B2 * | 8/2007 | Mehrvar et al. | 370/412 |
| 7,339,929 | B2 * | 3/2008 | Zelig et al. | 370/390 |
| 7,577,722 | B1 * | 8/2009 | Khandekar et al. | 709/220 |
| 7,633,909 | B1 * | 12/2009 | Jones et al. | 370/338 |
| 7,634,608 | B2 * | 12/2009 | Droux et al. | 710/306 |
| 7,640,298 | B2 * | 12/2009 | Berg | 709/203 |
| 7,643,482 | B2 * | 1/2010 | Droux et al. | 370/389 |
| 7,660,324 | B2 * | 2/2010 | Oguchi et al. | 370/432 |
| 7,715,416 | B2 * | 5/2010 | Srinivasan et al. | 370/412 |
| 7,752,635 | B2 * | 7/2010 | Lewites | 719/327 |
| 7,802,000 | B1 * | 9/2010 | Huang et al. | 709/228 |
| 7,865,893 | B1 * | 1/2011 | Omelyanchuk et al. | 718/1 |
| 7,865,908 | B2 * | 1/2011 | Garg et al. | 719/321 |
| 7,941,812 | B2 * | 5/2011 | Sekar | 719/319 |
| 7,983,257 | B2 * | 7/2011 | Chavan et al. | 370/389 |
| 7,983,266 | B2 * | 7/2011 | Srinivasan et al. | 370/392 |
| 8,005,013 | B2 * | 8/2011 | Teisberg et al. | 370/254 |
| 8,019,837 | B2 * | 9/2011 | Kannan et al. | 709/220 |
| 8,200,752 | B2 * | 6/2012 | Choudhary et al. | 709/203 |
| 8,683,004 | B2 * | 3/2014 | Bauer | 709/217 |
| 2004/0240453 | A1 * | 12/2004 | Ikeda et al. | 370/395.21 |
| 2007/0280243 | A1 * | 12/2007 | Wray et al. | 370/392 |
| 2008/0059811 | A1 * | 3/2008 | Sahita et al. | 713/194 |
| 2008/0310421 | A1 * | 12/2008 | Teisberg et al. | 370/395.53 |
| 2010/0040063 | A1 * | 2/2010 | Srinivasan et al. | 370/392 |
| 2010/0154051 | A1 * | 6/2010 | Bauer | 726/15 |
| 2011/0299537 | A1 * | 12/2011 | Saraiya et al. | 370/392 |
| 2012/0005521 | A1 * | 1/2012 | Droux et al. | 714/4.11 |

* cited by examiner

*Primary Examiner* — Sargon Nano

(57) ABSTRACT

Methods, systems, and computer programs for implementing private Ethernet overlay networks over a shared Ethernet infrastructure in a virtual environment are presented. In one embodiment, a method includes an operation for sending a packet on a private virtual network from a first virtual machine (VM) in a first host to a second VM. The first and second VMs are members of a fenced group of computers that have exclusive direct access to the private virtual network, where VMs outside the fenced group do not have direct access to the packets that travel on the private virtual network. Further, the method includes encapsulating the packet at the first host to include a new header as well as a fence identifier for the fenced group. If the encapsulated packet is too big for the underlying network, the packet is fragmented for transmission between hosts. The packet is received at a host where the second VM is executing and the packet is de-encapsulated to extract the new header and the fence identifier. Additionally, the method includes an operation for delivering the de-encapsulated packet to the second VM after validating that the destination address in the packet and the fence identifier correspond to the destination address and the fence identifier, respectively, of the second VM. The private virtual network scheme is transparent to the VM's operating system, and unicast messaging within the fenced group improves network efficiency.

18 Claims, 12 Drawing Sheets

| Encapsulation | | | | | | | Payload |
|---|---|---|---|---|---|---|---|
| Standard Ethernet Header | | | T/L | Fence Protocol Data | | | Standard Ethernet Packet |
| Destination Address | Source Address | | | | | | |
| | Encapsulated Address | | Fence EthType | VSLA version | Frag Type | Frag Seq # | Fence ID | Original Ethernet Frame |
| | Fence OUI | Install ID | Host ID | | | | | | |
| 6 bytes | 24 bits | 8 bits | 16 bits | 2 bytes | 2 bits | 2 bits | 4 bits | 24 bits | 0-1518 bytes |

Fig. 6

| LAN ID | 2 | 3 | ... |
|---|---|---|---|
| MTU | 1500 | 2000 | ... |

Fig. 11

| ID | OPI | LAN ID | MTU |
|---|---|---|---|
| 4100b9f869e0 | 3e,fffffe | 2 | 1500 |
| 4100b9f86d40 | 3e,0000fb | 2 | 1500 |
| 4100b9f86f30 | 3e,0000fb | 2 | 1500 |

Fig. 12

| Inner MAC | Outer MAC | used | age | seen |
|---|---|---|---|---|
| | | | | Port:0x4100b9f869e0 |
| | | | | Port:0x4100b9f86d40 |
| 00:50:56:3e:0a:1b | 00:13:f5:3e:02:c2 | 1 | 1 | 0 |
| 00:50:56:3e:03:eb | 00:13:f5:3e:02:e2 | 1 | 1 | 0 |
| 00:50:56:3e:03:ef | 00:13:f5:3e:03:02 | 1 | 1 | 1 |
| 00:50:56:3e:03:ed | 00:13:f5:3e:02:f2 | 1 | 1 | 1 |
| | | | | Port:0x4100b9f86f30 |
| 00:50:56:3e:0a:1b | 00:13:f5:3e:02:c2 | 1 | 0 | 1 |
| 00:50:56:3e:03:eb | 00:13:f5:3e:02:e2 | 1 | 0 | 1 |
| 00:50:56:3e:03:ee | 00:13:f5:3e:03:02 | 1 | 0 | 1 |
| 00:50:56:3e:03:ed | 00:13:f5:3e:02:f2 | 1 | 0 | 1 |

Fig. 13

PRIVATE ETHERNET OVERLAY NETWORKS OVER A SHARED ETHERNET IN A VIRTUAL ENVIRONMENT

CROSS REFERENCE TO RELATED APPLICATIONS

This application is related by subject matter to U.S. patent application Ser. No. 12/510,072, filed Jul. 27, 2009, and entitled "AUTOMATED NETWORK CONFIGURATION OF VIRTUAL MACHINES IN A VIRTUAL LAB ENVIRONMENT"; U.S. patent application Ser. No. 12/510,135, filed Jul. 27, 2009, and entitled "MANAGEMENT AND IMPLEMENTATION OF ENCLOSED LOCAL NETWORKS IN A VIRTUAL LAB"; and U.S. patent application Ser. No. 12/571,224, filed Sep. 30, 2009, and entitled "PRIVATE ALLOCATED NETWORKS OVER SHARED COMMUNICATIONS INFRASTRUCTURE"; U.S. patent application Ser. No. 11/381,119, filed May 1, 2006, and entitled "VIRTUAL NETWORK IN SERVER FARM", all of which are incorporated herein by reference.

1. FIELD OF THE INVENTION

The present invention relates to methods, systems, and computer programs for deploying fenced groups of Virtual Machines (VMs) in a virtual infrastructure, and more particularly, to methods, systems, and computer programs for private networking among fenced groups of VMs executing in multiple hosts of the virtual infrastructure.

2. DESCRIPTION OF THE RELATED ART

Virtualization of computer resources generally involves abstracting computer hardware, which essentially isolates operating systems and applications from underlying hardware. Hardware is therefore shared among multiple operating systems and applications wherein each operating system and its corresponding applications are isolated in corresponding VMs and wherein each VM is a complete execution environment. As a result, hardware can be more efficiently utilized.

The virtualization of computer resources sometimes requires the virtualization of networking resources. To create a private network in a virtual infrastructure means that a set of virtual machines have exclusive access to this private network. However, virtual machines can be located in multiple hosts that may be connected to different physical networks. Trying to impose a private network on a distributed environment encompassing multiple physical networks is a complex problem. Further, sending a broadcast message in a private network presents two problems. First, the broadcast may be received by hosts which do not host any VMs in the private network, thus reducing the scalability of the entire distributed system. Second, if hosts are not located on adjacent layer 2 networks, the broadcast may not reach all hosts with VMs in the private network.

Virtual Local Area Networks (VLAN) are sometimes used to implement distributed networks for a set of computing resources that are not connected to one physical network. A VLAN is a group of hosts that communicate as if the group of hosts were attached to the Broadcast domain, regardless of their physical location. A VLAN has the same attributes as a physical Local Area Network (LAN), but the VLAN allows for end stations to be grouped together even if the end stations are not located on the same network switch. Network reconfiguration can be done through software instead of by physically relocating devices. Routers in VLAN topologies provide broadcast filtering, security, address summarization, and traffic flow management. However, VLANs only offer encapsulation and, by definition, switches may not bridge traffic between VLANs as it would violate the integrity of the VLAN broadcast domain. Further, VLANs are not easily programmable by a centralized virtual infrastructure manager.

Virtual labs, such as VMware's vCenter Lab Manager™ from the assignee of the present patent application, enable application development and test teams to create and deploy complex multi-tier system and network configurations on demand quickly. Testing engineers can set up, capture, and reset virtual machine configurations for demonstration environments in seconds. In addition, hands-on labs can be quickly configured and deployed for lab testing, hands-on training classes, etc.

The creation of virtual lab environments requires flexible tools to assist in the creation and management of computer networks. For example, if a test engineer decides to perform different tests simultaneously on one sample environment, the test engineer must deploy multiple times the sample environment. The multiple deployments must coexist in the virtual infrastructure. However, these environments often have network configurations that when deployed multiple times would cause networking routing problems, such as the creation of VMs with duplicate Internet Protocol (IP) addresses—an impermissible network scenario for the proper operation of the VMs and of the virtual lab environments.

Existing solutions required that VMs within the same private environment be executed on the same host using virtual switches in the host. However, the single-host implementation has drawbacks, such as a maximum number of VMs that can be deployed on a single host, inability to move VMs to different hosts for load balancing, unexpected host shutdowns, etc.

SUMMARY

Methods, systems, and computer programs for implementing private networking within a virtual infrastructure are presented. It should be appreciated that the present invention can be implemented in numerous ways, such as a process, an apparatus, a system, a device or a method on a computer readable medium. Several inventive embodiments of the present invention are described below.

In one embodiment, a method includes an operation for sending a packet on a private virtual network from a first virtual machine (VM) in a first host to a second VM. The first and second VMs are members of a fenced group of computers that have exclusive direct access to the private virtual network, where VMs outside the fenced group do not have direct access to the packets that travel on the private virtual network. Further, the method includes encapsulating the packet at the first host to include a new header as well as a fence identifier for the fenced group. The packet is received at a host where the second VM is executing and the packet is de-encapsulated to extract the new header and the fence identifier. Additionally, the method includes an operation for delivering the de-encapsulated packet to the second VM after validating that the destination address in the packet and the fence identifier correspond to the destination address and the fence identifier, respectively, of the second VM.

In another embodiment, a computer program embedded in a non-transitory computer-readable storage medium, when executed by one or more processors, for implementing private networking within a virtual infrastructure, includes program instructions for sending a packet on a private virtual network from a first VM in a first host to a second VM. The first and second VMs are members of a fenced group of computers that have exclusive direct access to the private virtual network, where VMs outside the fenced group do not have direct access to packets on the private virtual network. Further, the computer program includes program instructions for encapsulating the packet at the first host to include a new header and a fence identifier for the fenced group, and for receiving the packet at a host where the second VM is executing. Further yet, the computer includes program instructions for de-encapsulating the packet to extract the new header and the fence identifier, and program instructions for delivering the de-encapsulated packet to the second VM after validating that a destination address in the packet and the fence identifier correspond to the second VM.

In yet another embodiment, a system for private networking within a virtual infrastructure includes a first VM and a first filter in a first host, in addition to a second VM and a second filter in a second host. The first and second VMs are members of a fenced group of computers that have exclusive direct access to a private virtual network, where VMs outside the fenced group do not have direct access to packets on the private virtual network. The first filter encapsulates a packet sent on a private virtual network from the first VM, by adding to the packet a new header and a fence identifier for the fenced group. The second filter de-encapsulates the packet to extract the new header and the fence identifier, and the second filter delivers the de-encapsulated packet to the second VM after validating that a destination address in the packet and the fence identifier correspond to the second VM.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 6 provides a detailed illustration of the encapsulated packet, in accordance with one embodiment of the invention.

FIG. 11 shows the structure of a Maximum Transmission Unit (MTU) configuration table, according to one embodiment.

FIG. 12 shows one embodiment of an active-ports table.

FIG. 13 shows an embodiment of a bridge table.

DETAILED DESCRIPTION

The following embodiments describe methods and apparatus for implementing private networking within a virtual infrastructure. Embodiments of the invention use Media Access Control (MAC) encapsulation of Ethernet packets. The hosts that include Virtual Machines (VM) from fenced groups of machines implement distributed switching with learning for unicast delivery. As a result, VMs are allowed to migrate to other hosts to enable resource management and High Availability (HA). Further, the private network implementation is transparent to the guest operating system (GOS) in the VMs and provides an added level of privacy.

With a host-spanning private network (HSPN), VMs can be placed on any host where the private network is implemented. The HSPN may span hosts in a cluster or clusters in a datacenter, allowing large groups of VMs to communicate over the private network. Additionally, VMs may move between hosts since VMs maintain private network connectivity. A VM can also be powered-on in a different host after failover and still retain network connectivity. Further, VMs get their own isolated private level 2 connectivity without the need to obtain Virtual Local Area Networks (VLAN) ID resources or even setup VLANs. Creating a HSPN is therefore simpler because there is no dependency on the network administrator. The HSPN can be deployed on either a VLAN or an Ethernet segment.

It should be appreciated that some embodiments of the invention are described below using Ethernet, Internet Protocol (IP), and Transmission Control Protocol (TCP) protocols. Other embodiments may utilize different protocols, such as an Open Systems Interconnection (OSI) network stack, and the same principles described herein apply. The embodiments described below should therefore not be interpreted to be exclusive or limiting, but rather exemplary or illustrative.

It will be obvious, however, to one skilled in the art, that the present invention may be practiced without some or all of these specific details. In other instances, well known process operations have not been described in detail in order not to unnecessarily obscure the present invention.

Figure 1:
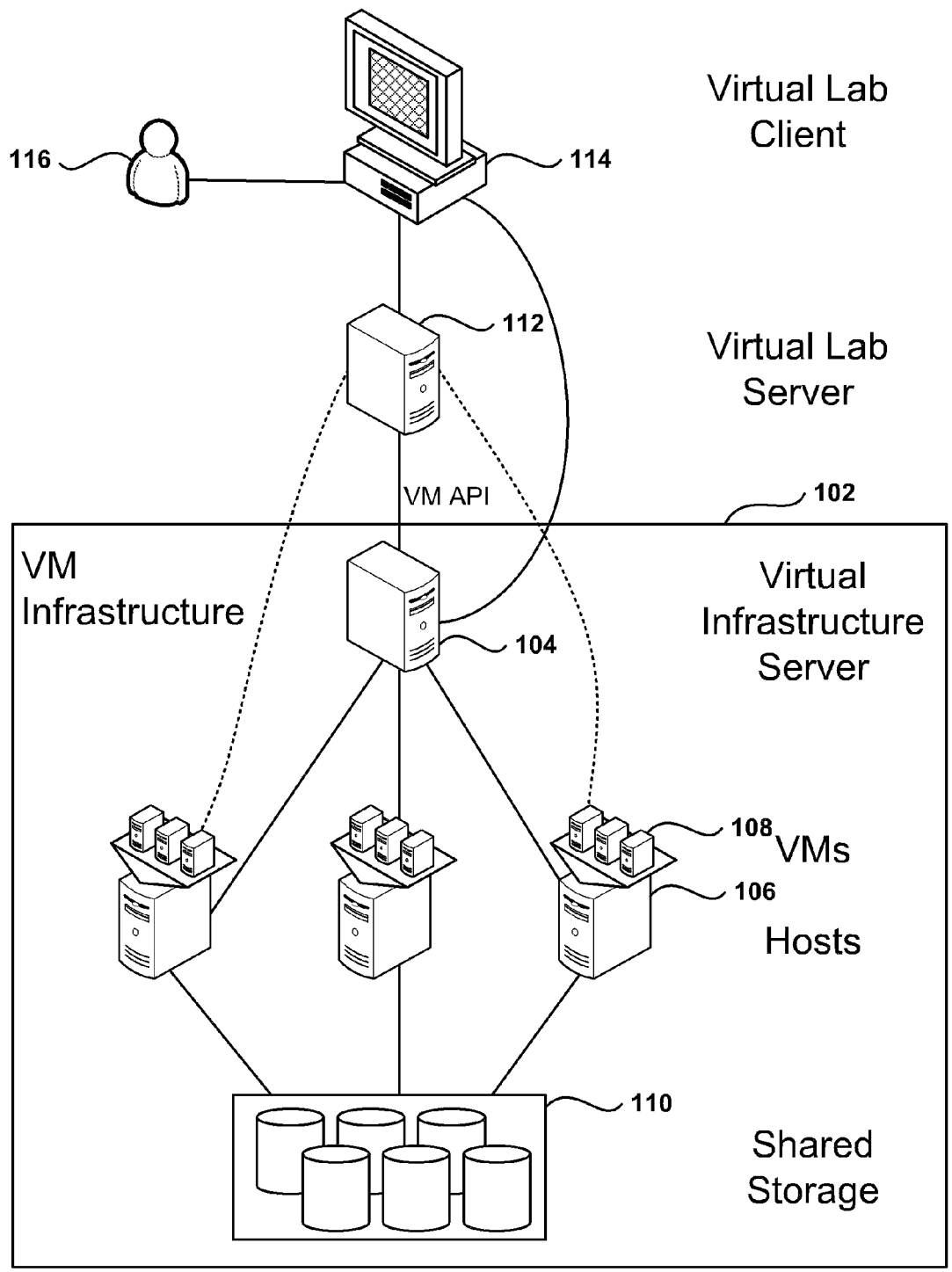
FIG. 1 includes an architectural diagram of an embodiment of a virtual infrastructure system.

FIG. 1 includes an architectural diagram of an embodiment of a virtual infrastructure system. Virtual infrastructure 102 includes one or more virtual infrastructure servers 104 that manage a plurality of hosts 106. Virtual machines 108 are instantiated in hosts 106, and the multiple hosts share a plurality of resources within the virtual infrastructure, such as shared storage 110. A configuration is a core element of a virtual lab and is composed of virtual machines and virtual lab networks. Virtual lab users can group, deploy, save, share, and monitor multi-machine configurations. Configurations reside in the library or in user workspaces, in which case they are referred to as workspace configurations.

Many applications run on more than one machine and grouping machines in one configuration is more convenient to manage the applications. For example, in a classic client-server application, the database server may run on one machine, the application server on another machine, and the client on a third machine. All these machines would be configured to run with each other. Other servers may execute related applications, such as LDAP servers, Domain Name servers, domain controllers, etc. Virtual lab server allows the grouping of these dependent machines into a Configuration, which can be checked in and out of the library. When a configuration is checked out, all the dependent machines configured to work with each other are activated at the same time. Library configurations can also store the running state of machines so the deployment of machines that are already running is faster.

Virtual lab networks, also referred to herein as enclosed local networks, can be categorized as private networks and shared networks. Private networks in a configuration are those networks available exclusively to VMs in the configuration, that is, only VMs in the configuration can have a Network Interface Controller (NIC) or VNIC connected directly to a switch or virtual switch (VSwitch) for the private network. Access to data on a private network is restricted to members of the configuration, that is, the private network is isolated from other entities outside the configuration. In one embodiment, a private network in the configuration can be connected to a physical network to provide external connectivity to the VMs in the private network. Private networks in a configuration are also referred to herein as Configuration Local Networks (CLN) or virtual networks. Shared networks, also referred to herein as shared physical networks or physical networks, are available to all VMs in the virtual infrastructure, which means that a configuration including a shared network will enable VMs in the shared network to communicate with other VMs in the virtual infrastructure connected, directly or indirectly, to the shared network. In one embodiment, a shared network is part of a Virtual Local Area Network (VLAN).

Deploying a configuration causes the VMs and networks in the configuration to be instantiated in the virtual infrastructure. Instantiating the VMs includes registering the VMs in the virtual infrastructure and powering-on the VMs. When an individual VM from a configuration is deployed, virtual lab deploys all shared networks and CLNs associated with the configuration using the network connectivity options in the configuration. Undeploying a configuration de-instantiates the VMs in the configuration from the virtual infrastructure. De-instantiating VMs includes powering off or suspending the VMs and un-registering the VMs from the virtual infrastructure. The state of the deployment can be saved in storage or discarded. Saving the memory state helps debugging memory-specific issues and makes VMs in the configuration ready for deployment and use almost instantly.

Virtual lab server 112 manages and deploys virtual machine configurations in a collection of hosts 106. It should be appreciated that not all hosts 106 need to be part of the scope of virtual lab server 112, although in one embodiment, all the hosts are within the scope of virtual lab server 112. Virtual lab server 112 manages hosts 106 by communicating with virtual infrastructure server 104, and by using virtual lab server agents installed on those hosts. In one embodiment, virtual lab server 112 communicates with virtual infrastructure server 104 via an Application Programming Interface (API), for example, to request the instantiation of VMs and networks.

Although virtual lab server 112 is used to perform some management tasks on hosts 106, the continuous presence of virtual lab server 112 is not required for the normal operation of deployed VMs, which can continue to run even if virtual lab server 112 becomes unreachable, for example because a network failure. One or more users 116 interface with virtual lab server 112 and virtual infrastructure 102 via a computer interface, which in one embodiment is performed via web browser.

Figure 2:
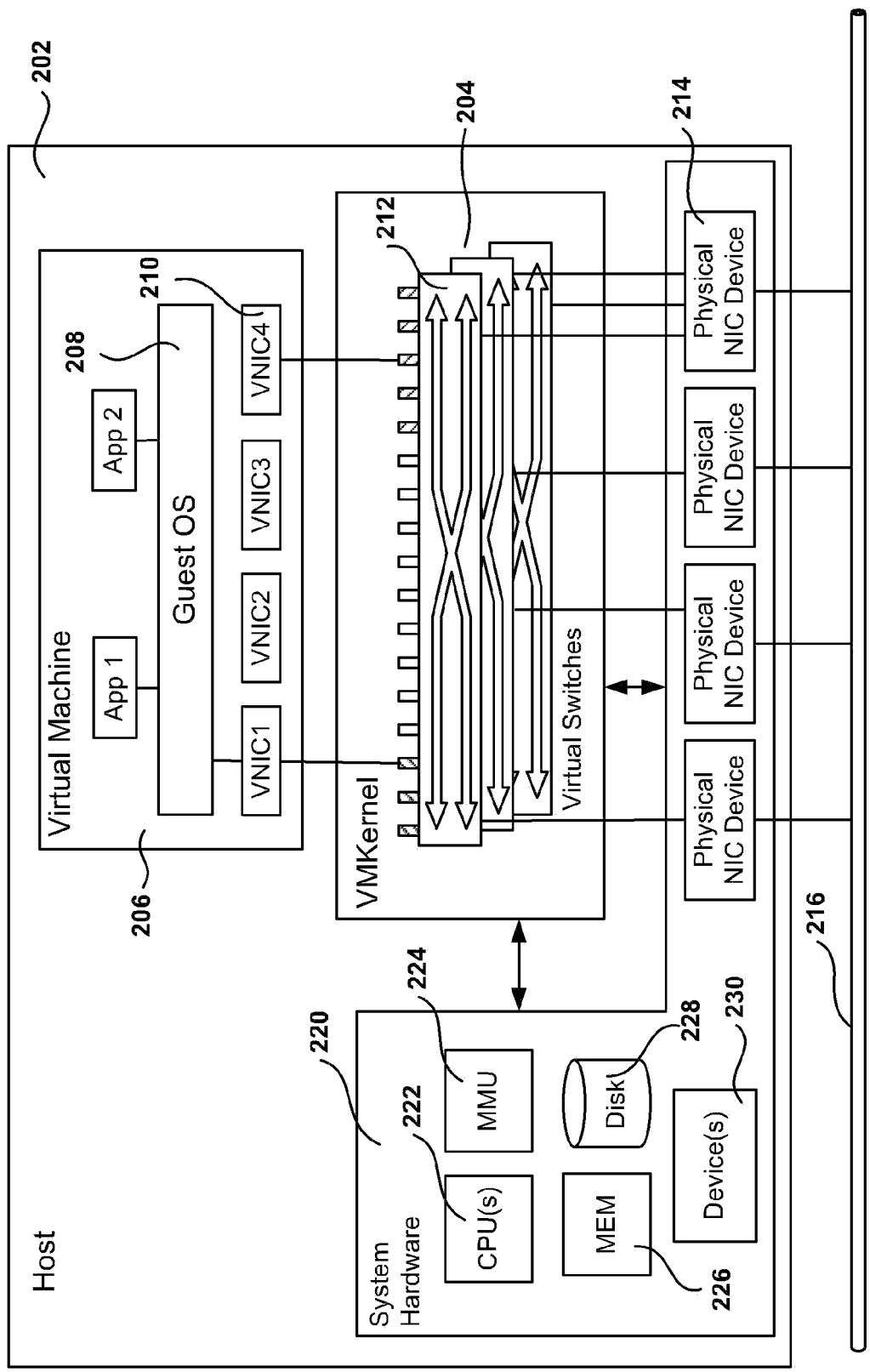
FIG. 2 depicts one embodiment of the host architecture for instantiating Virtual Machines (VM) with multiple Virtual Network Interface Cards (VNIC).

FIG. 2 depicts one embodiment of the host architecture for instantiating VMs with multiple Virtual Network Interface Cards (VNIC). In one embodiment, VMkernel 204, also referred to as virtual infrastructure layer, manages the assignment of VMs 206 in host 202. VM 206 includes Guest Operating System (GOS) 208 and multiple VNICs 210. Each VNIC 210 is connected to a VSwitch 212 that provides network switch functionality for the corresponding virtual network interfaces. VSwitches 212 are connected to a physical NIC device in the host to provide access to physical network 216. Each of the VNICs and VSwitches are independent, thus a VM can connect to several virtual networks via several VNICs that connect to one or more physical NIC devices 214. In another embodiment, each VSwitch 212 is connected to a different physical NIC device, thus each VSwitch 212 provides connectivity to a different physical network. In the sample configuration illustrated in FIG. 2, VSwitch 212 provides switching for virtual networks "Network 1" (VNIC1) and "Network 4" (VNIC4). VSwitch 212 assigns a set of ports to "Network 1" and a different set of ports to "Network 4," where each set of ports supports Media Access Control (MAC) addressing for the corresponding virtual network. Thus, packets from "Network 1" coexist with packets from "Network 4" on the same transmission media.

The virtual computer system supports VM 206. As in conventional computer systems, both system hardware 220 and system software are included. The system hardware 220 includes one or more processors (CPUs) 222, which may be a single processor, or two or more cooperating processors in a known multiprocessor arrangement. The system hardware also includes system memory 226, one or more disks 228, and some form of Memory Management Unit (MMU) 224. The system memory is typically some form of high-speed RAM (random access memory), whereas the disk is typically a non-volatile, mass storage device. As is well understood in the field of computer engineering, the system hardware also includes, or is connected to, conventional registers, interrupt handling circuitry, a clock, etc., which, for the sake of simplicity, are not shown in the figure.

The system software includes VMKernel 204, which has drivers for controlling and communicating with various devices 230, NICs 214, and disk 228. In VM 206, the physical system components of a "real" computer are emulated in software, that is, they are virtualized. Thus, VM 206 will typically include virtualized guest OS 208 and virtualized system hardware (not shown), which in turn includes one or more virtual CPUs, virtual system memory, one or more virtual disks, one or more virtual devices, etc., all of which are implemented in software to emulate the corresponding components of an actual computer.

The guest OS 208 may, but need not, simply be a copy of a conventional, commodity OS. The interface between VM 103 and the underlying host hardware 220 is responsible for executing VM related instructions and for transferring data to and from the actual physical memory 226, the processor(s) 222, the disk(s) 228 and other devices.

Figure 3:
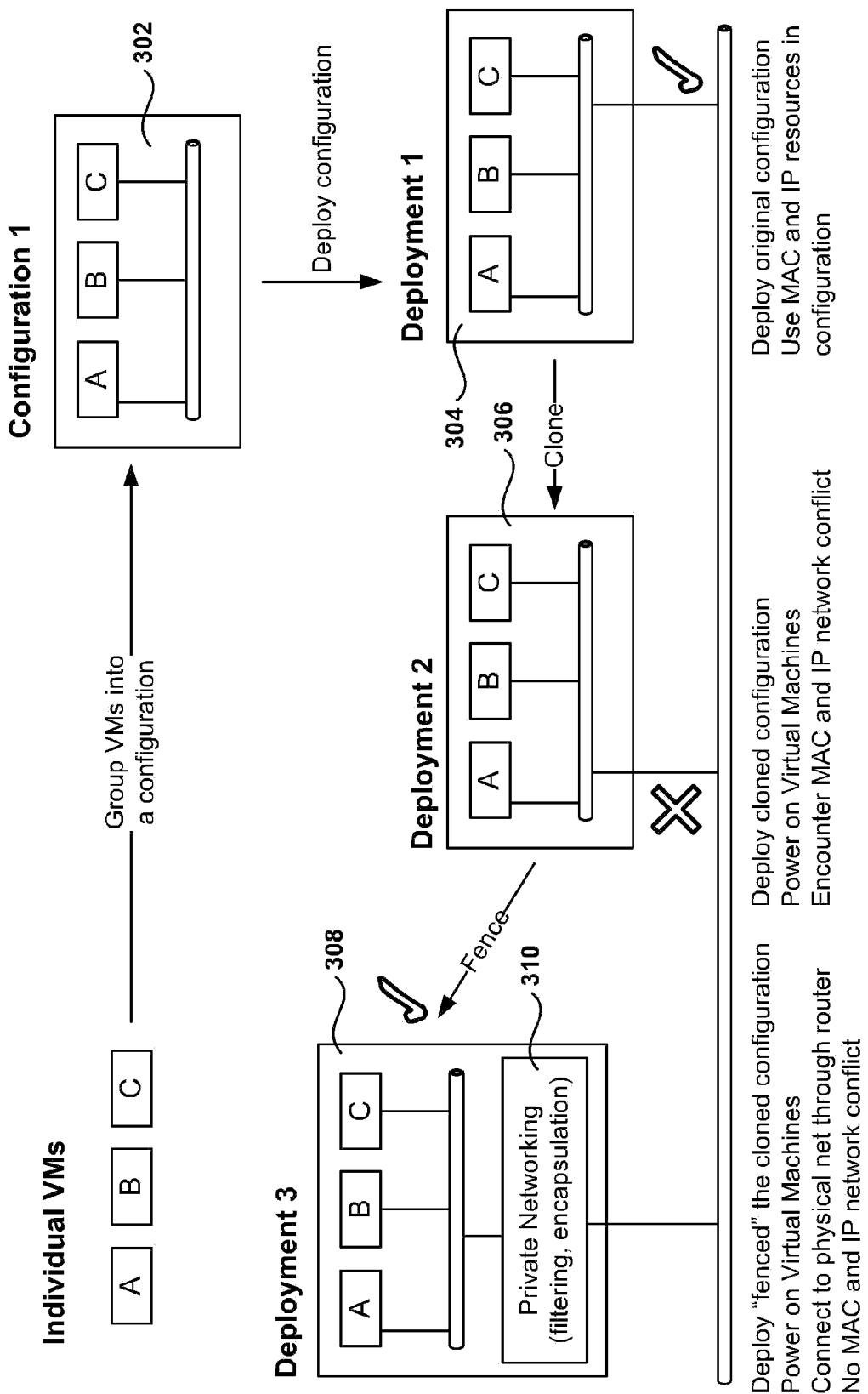
FIG. 3 illustrates the deployment of multiple VM configurations, according to one embodiment.

FIG. 3 illustrates the deployment of multiple VM configurations, according to one embodiment. Configuration 302, which includes VMs A, B, and C, is deployed a first time resulting in deployment 304. When a configuration of machines is copied, the system performs the copying, also referred to as cloning, in a short amount of time, taking a fraction of the disk space a normal copy would take. This is referred to as linked clones. For example, when a virtual lab server VM with an 80 GB disk, is cloned, the 80 GB are not copied. Instead a 16 MB file called a linked clone is created, which points to the 80 GB disk and acts like a new instance of the disk.

Another feature of virtual lab server is the ability to use multiple copies of VMs simultaneously, without modifying them. When machines are copied using traditional techniques, the original and the copy cannot be used simultaneously due to duplicate IP addresses, MAC addresses, and security IDs (in the case of Windows). Virtual lab server provides a networking technology called "fencing" that allows multiple unchanged copies of virtual lab server VMs to be run simultaneously on the same network without conflict, while still allowing the VMs to access network resources and be accessed remotely.

FIG. 3 illustrates the process of deploying fenced VMs. The first deployment 304 can use the IP and Ethernet addresses in configuration 302 and be directly connected to the network without any conflicts (of course assuming no other VMs in the network have the same addresses). Deployment 306 is created after cloning the first deployment 304. However, deployment 306 cannot be connected directly to the network because there would be duplicate addresses on the network.

Deployment 308 is deployed in fenced mode, including private networking module 310, which performs, among other things, filtering and encapsulation of network packets before sending the packets on the physical network. This way, there is no duplication of addresses in the physical network.

Figure 4:
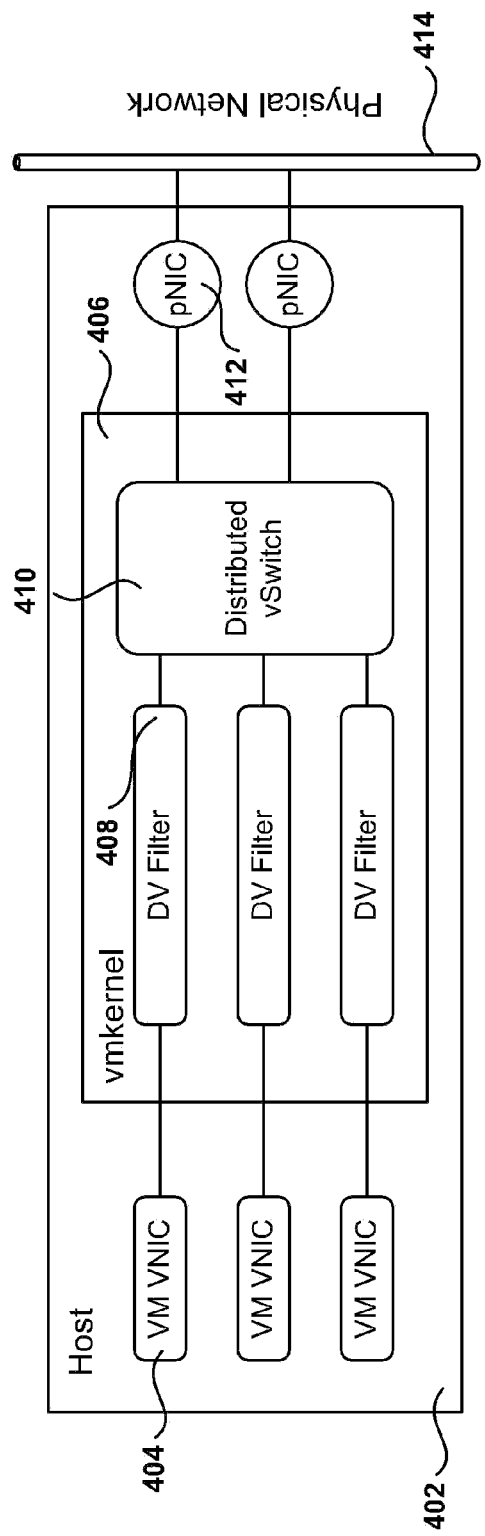
FIG. 4 illustrates the use of packet filters within the host, according to one embodiment.

FIG. 4 illustrates the use of packet filters within host 402, according to one embodiment. Host 402 includes several VMs. Each VM is associated with a VNIC 404. In general, it is assumed that each VM only has one network connection, which means one VNIC. However, it is possible for a VM to have multiple network connections, where each connection is associated with a different VNIC. Principles of the invention can also be applied when a VM has multiple VNICs, because the important consideration is that each VNIC be associated with one layer 2 and one layer 3 address. Therefore, it would be more precise to refer to VNICs instead of VMs, but for ease of description VMs are used in the description of some embodiments. However, it is understood that if a VM has more than one VNIC, then each VNIC would be separately considered and belonging to a separate private network.

A Distributed Virtual (DV) Filter 408 is associated with VNIC 404 and performs filtering and encapsulation of packets originating in VNIC 404 before the packets reach distributed vSwitch 410. On the receiving side, DV Filter 408 performs filtering and de-encapsulation (stripping) when needed. Distributed vSwitch 410 is connected to one or more physical NICs (PNIC) 412 that connect host 402 to physical network 414.

The use of a DV Filter enables the implementation of the cross-host private virtual network. The DV filter is compatible with VLAN and other overlays solutions as the encapsulation performed by DV Filter 408 is transparent to switches and routers on the network. More details on the operation of DV Filter 408 are given below in reference to FIGS. 7-13.

Figure 5:
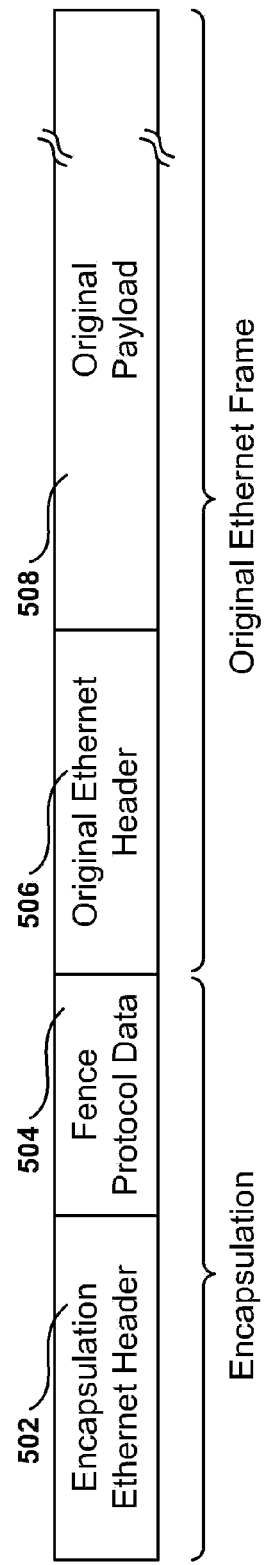
FIG. 5 shows one embodiment for Ethernet frame encapsulation.

FIG. 5 shows one embodiment for Ethernet frame encapsulation. A packet sent from a VM in the private virtual network includes original Ethernet header 506 and original payload 508. The DV Filter adds a new header and new data to the original packet. The encapsulation Ethernet header 502 has the standard fields of an Ethernet header. More details on the composition of encapsulation Ethernet header 502 are given below in reference to FIG. 6. DV Filter also adds fence protocol data 504 to the data field of the new Ethernet packet in front of the original packet. In other words, the payload for the new packet includes fence protocol data 504, original Ethernet header 506, and original payload 508.

Since the new encapsulated packet includes additional bytes, it is possible that the resulting encapsulated packet exceeds the Maximum Transmission Unit (MTU) of layer 2. In this case fragmentation is required. The encapsulated packet is fragmented in 2 different packets, transmitted separately, and the DV filter at the receiving host de-encapsulates the two packets by combining their contents to recreate the encapsulated packet. In one embodiment, fragmentation is avoided by increasing the uplink MTU. In another embodiment, the VM is configured by the user with an MTU that is smaller from the MTU on the network, such that encapsulation can be performed on all packets without fragmentation.

Because of the MAC-in-MAC Ethernet frame encapsulation the traffic of the private virtual network is isolated from other traffic, in the sense that the Ethernet headers of the private network packets are "hidden" from view. Also, the private network packets terminate in hosts that implement the private networking, allowing an additional level of control and security. Switches and routers on the network do not see or have to deal with this encapsulation because they only see a standard Ethernet header, which is processed the same as any standard Ethernet header. As a result, no network infrastructure or additional resources are required to implement private networking, there no MAC addressing collisions, and VLANs are interoperable with the private virtual network scheme. Also, a large number of private networks is possible (i.e. 16 million or more) per VLAN.

FIG. 6 provides a detailed illustration of the encapsulated packet, in accordance with one embodiment of the invention. As with any standard Ethernet header, the encapsulating header includes a destination address, a source address and a time to live (T/L) field. The source and destination address are form by joining together a fence Organizationally-Unique-Identifier (OUI) (24 bits), an installation identifier ("Install ID") (8 bits), and a host identifier (16 bits). An OUI is a 24-bit number that is purchased from the Institute of Electrical and Electronics Engineers, Incorporated (IEEE) Registration Authority. This identifier uniquely identifies a vendor, manufacturer, or other organization globally and effectively reserves a block of each possible type of derivative identifier (such as MAC addresses, group addresses, Subnetwork Access Protocol protocol identifiers, etc.) for the exclusive use of the assignee.

The fence OUI is a dedicated OUI reserved for private virtual networking. Therefore, there will not be address collisions on the network because nodes that are not part of the private networking scheme will not use the reserved fence OUI. The destination address in the encapsulating header can also be a broadcast address, and all the hosts in the network will receive this packet.

The virtual lab server installation ID is unique on a LAN segment and is managed by virtual lab server 112 (FIG. 1). The fence identifier uniquely identifies a private network within the virtual lab server. Fence IDs can be recycled over time. Further, the T/L field in the encapsulating header includes the fence Ethernet type which is an IEEE assigned number (in this case assigned to VMware, the assignee of the present application) that identifies the protocol carried by the Ethernet frame. More specifically, the protocol identified is the Fence protocol, i.e., the protocol to perform MAC-in-MAC framing. The Ethernet type is used to distinguish one protocol from another.

The fence protocol data includes a version ID of the private network implementation or protocol (2 bits), a fragment type (2 bits), a fragment sequence number, and a fence identifier. The fragment type and sequence number indicate if the original packet has been fragmented, and if so, which fragment number corresponds to the packet. The fence identifier indicates a value assigned to the private virtual network. In one embodiment, this field is 24 bits which allows for more than 16 million different private networks per real LAN.

It should be appreciated that the embodiments illustrated in FIGS. 5 and 6 are exemplary data fields for encapsulating network packets. Other embodiments may utilize different fields, or may arrange the data in varying manners. The embodiments illustrated in FIGS. 5 and 6 should therefore not be interpreted to be exclusive or limiting, but rather exemplary or illustrative.

Figure 7:
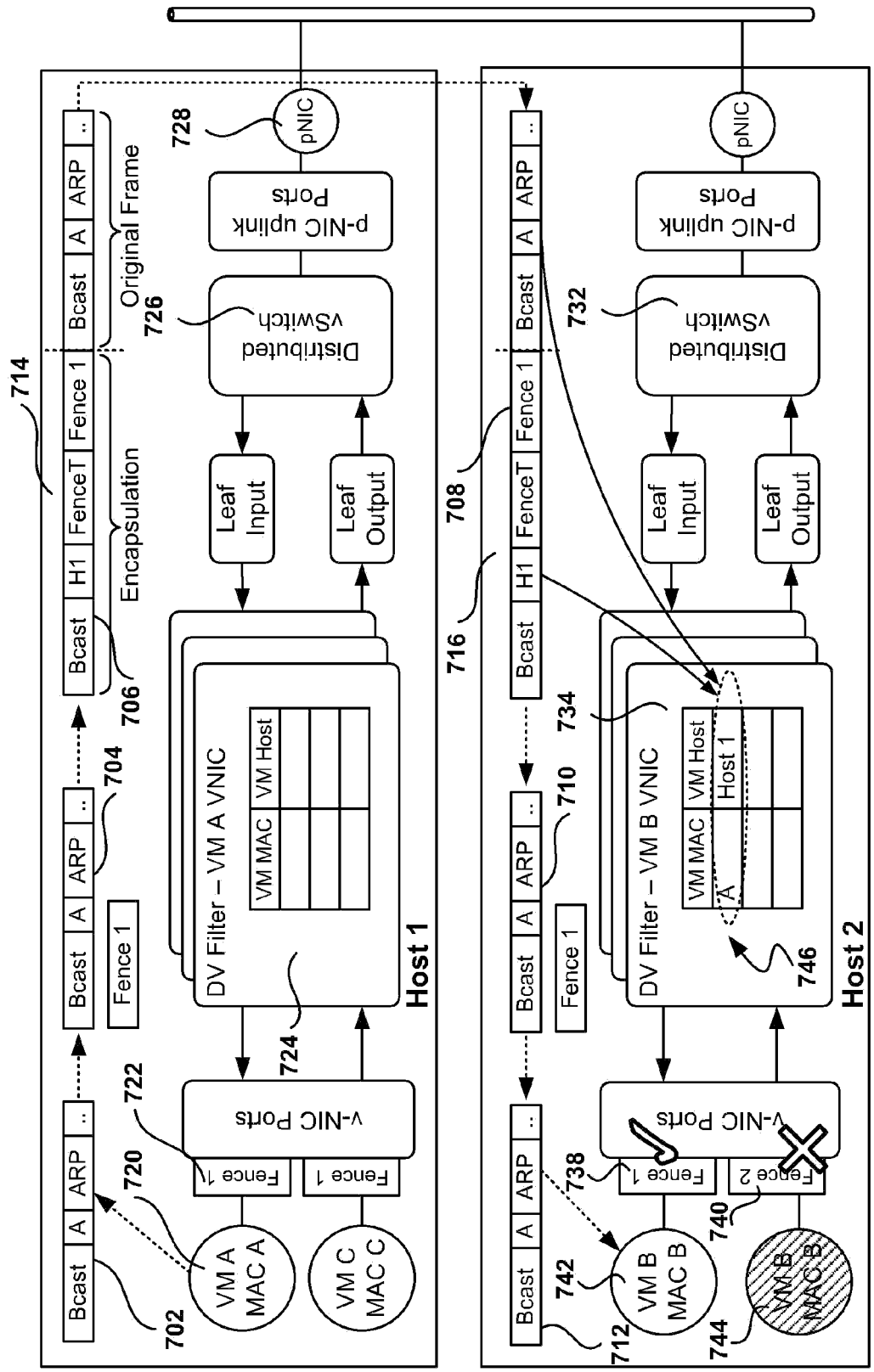
FIG. 7 illustrates the flow of a broadcast packet sent within the private virtual network, according to one embodiment.

FIG. 7 illustrates the flow of a broadcast packet sent within the private virtual network, according to one embodiment. FIG. 7 illustrates some of the events that take place after VM A 720 is initialized. During network initialization, VM A 720 sends a broadcast Address Resolution Protocol (ARP) packet 702 to be delivered to all nodes that have layer-2 connectivity on the private network associated with Fence 1. Fence 1 includes VM A 720 in Host 1 714 and VM B 742 in Host 2 716. It should be noted that VM B 744, also in Host 2 716, is a clone of VM B 742 and is connected to a different private network from the one connected to VM A 720 and VM B 742.

Packet 702 is a standard ARP broadcast packet including VM A's address as the source address. VM A 720 sends the message through port 722, which is associated with Fence 1. DV Filter 724 receives packet 704, associated with Fence 1, and adds the encapsulating header, as described above in reference to FIGS. 5 and 6, to create encapsulated packet 706. The destination address of the encapsulating header is also an Ethernet broadcast address. DV Filter 724 sends packet 706 to distributed vSwitch 726 for transmittal over the network via physical NIC 728.

Host 2 716 receives packet 706 (referred to as packet 708) and the Distributed vSwitch forwards packet 708 to the DV Filters for all VNICS, since it is a broadcast packet. DV Filter 734 associated with VM B 742 examines the source address. It determines that packet 708 is a private virtual network packet because of the unique fence OUI. This packet comes from Host 1 because the source address includes Host 1's ID and it is originally from VM A because VM A's Ethernet address is in the original Ethernet header. Since DV Filter 734 did not have an entry for VM A in that private network, an entry is added to bridge table 746 mapping VM A with Host 1. More details on the structure of bridge table 746 are given below in reference to FIG. 13.

DV Filter 734 de-encapsulates the packet by stripping the encapsulating headers and added data to create packet 710, which is associated with Fence 1 as indicated in the Fence ID of the fence protocol data. DV Filter then checks for ports associated with Fence 1 and the destination address of packet 710, which is every node since it is a broadcast address. Since VM 742 is associated with Fence 1 738, packet 712 is delivered to VM B 742. On the other hand, VM B 744 will not get delivery of the packet or frame because the DV Filter for VM B 744 (not shown) will detect that the frame is for Fence 1 nodes and will drop the frame because VM B 744 does not belong to Fence 1. It belongs to Fence 2.

It should be noted that this mechanism provides an added level of security by assuring that the fence is isolated. Packets that have no Fence ID will be dropped and will never make it inside the fence.

Figure 8:
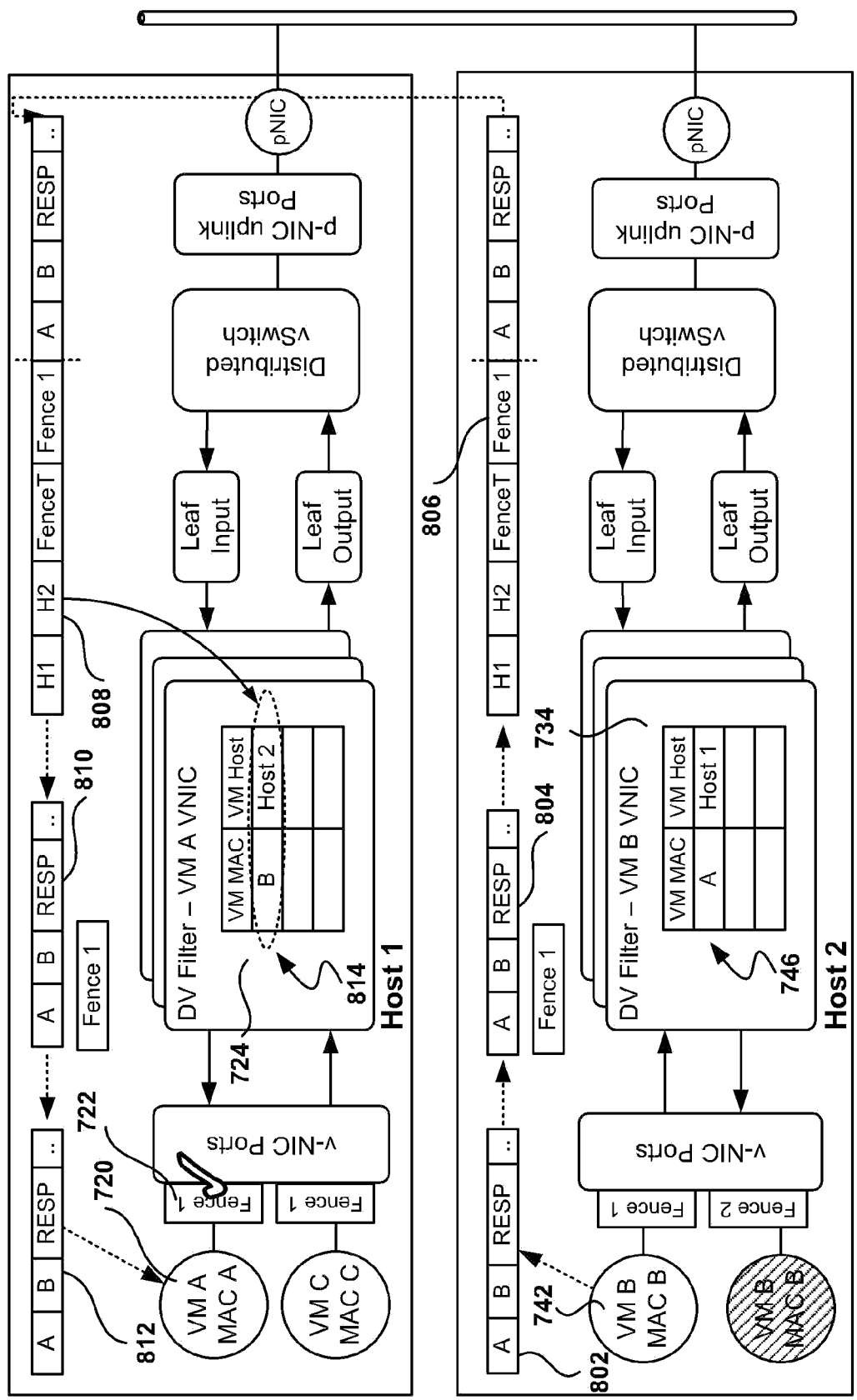
FIG. 8 illustrates the flow of the response packet to the broadcast, according to one embodiment.

FIG. 8 illustrates the flow of the response packet to the broadcast, according to one embodiment. VM B 742 replies to packet 712 with packet 802 addressed to VM A 720. DV Filter 734 receives packet 804, associated with Fence 1 because VM B's port is associated with Fence 1. DV Filter 734 checks bridge table 746 and finds an entry for VM A indicating that VM A is executing in Host 1. DV Filter proceeds to create new Ethernet packet 806 by encapsulating packet 804. The addresses in the encapsulation header are created according to the process described in reference to FIG. 6. For example, the destination Ethernet address is constructed by combining the fence OUI (24 bits), the installation identifier (8 bits), and the number associated with Host 1 (16 bits). The fence ID for Fence 1 is added after the header and before the original packet, as previously described.

After packet 806 is unicast via the physical network, Host 1 receives packet 808, which is processed in similar fashion as described in reference to FIG. 7, except that the destination address is not a broadcast address. DV Filter 724 determines that the packet is from VM B in Fence 1. Since there is not an entry for VM B in bridge table 814, a new entry for VM B is added to bridge table 814 indicating that VM B is executing in Host 2. Additionally, DV Filter 724 proceeds to strip packet 808 to restore original packet 802 sent by VM B 74, by taking out the added header and the additional payload ahead of the original packet. This results in packet 810, which is associated with Fence 1 because the payload in packet 808 indicates that the packet is for a Fence 1 node. Since VM A's port is associated with Fence 1 722 and the Ethernet destination address, packet 812 is successfully delivered to VM A 720.

Figure 9A:
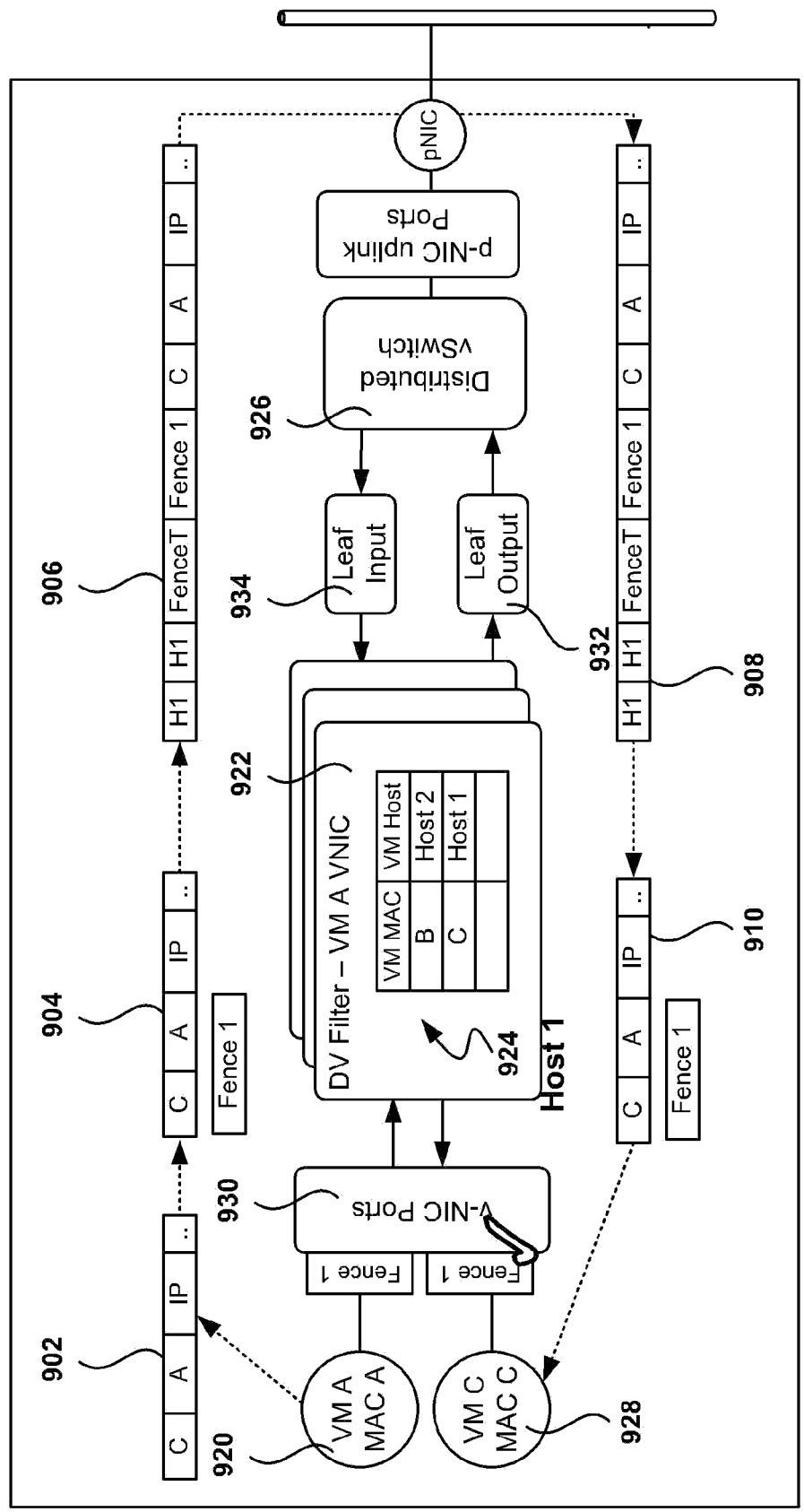
FIG. 9A illustrates the flow of a packet travelling between VMs in the same host, according to one embodiment.

FIG. 9A illustrates the flow of a packet travelling between VMs in the same host, according to one embodiment. Packet 902 is sent from VM A 920 with a destination address of VM C 928, with both VMs executing in the same host. The process is similar as the one previously described in FIGS. 7 and 8, except that the packet does not travel over the physical network and is "turned around" by Distributed VSwitch 926. Thus, packet 902 is sent to VNIC 930, which in turn sends packet 904 to DV Filter 922.

It should be noted that although packets are described herein as travelling (sent and received) among the different entities of the chain of communication, it is not necessary to actually transfer the whole packet from one module to the next. For example, a pointer to the message may be passed between VNIC 930 and DV filter without having to actually make a copy of the packet.

DV filter for VM A 922 checks bridge table 924 and determines that the destination VM C is executing in Host 1. The corresponding encapsulation is performed to create packet 906 which is forwarded to distributed vSwitch 926 via output leaf 932. VSwitch 926 determines that the destination address of packet 906 is for a VM inside the host and "turns the packet around" by forwarding packet 908 to the DV Filter for VM C (not shown) via input leaf 934. The DV Filter for VM C strips the headers and, after checking the destination address and the Fence ID, delivers the packet to VM C's port in VNIC 930.

Figure 9B:
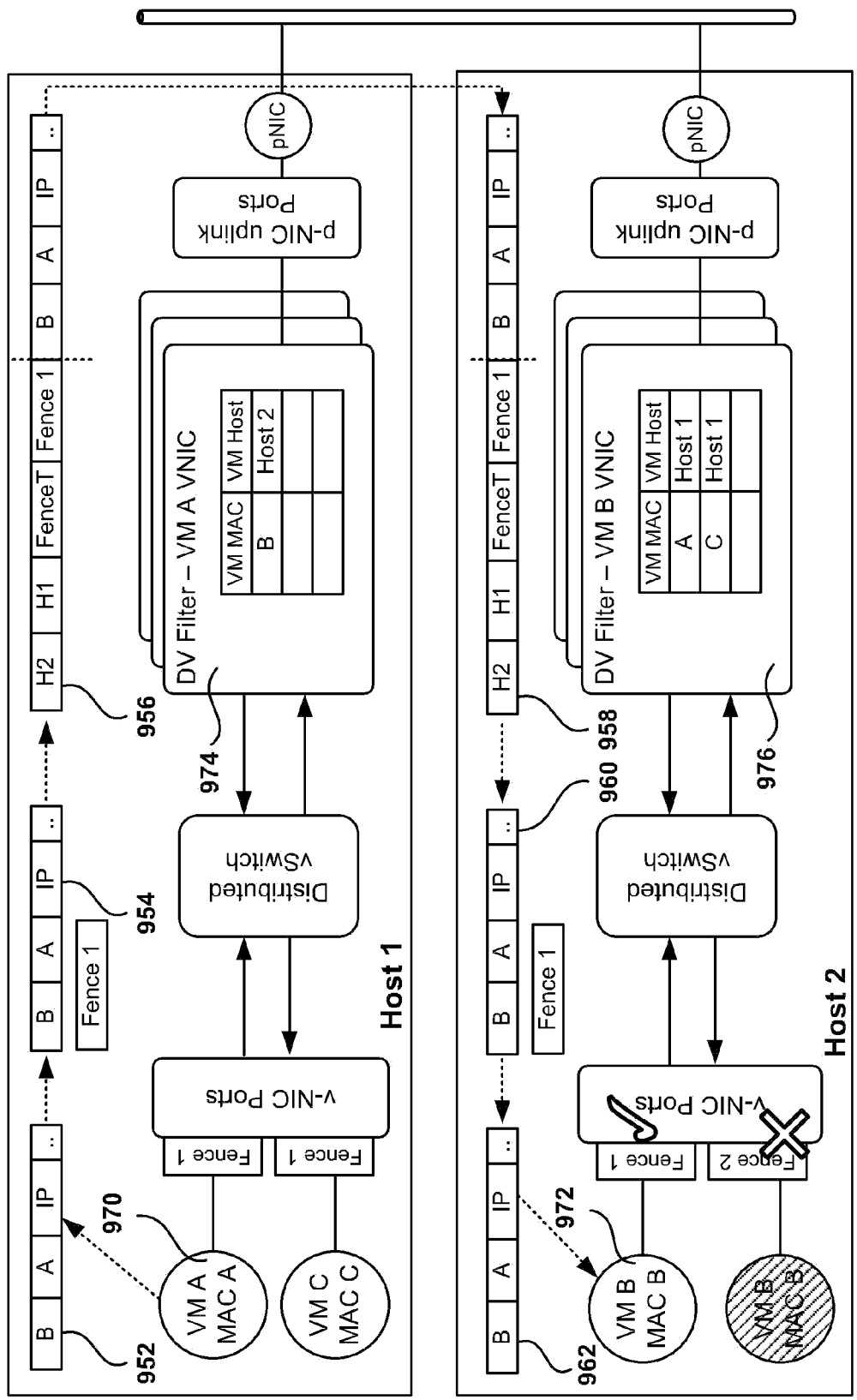
FIG. 9B illustrates the flow of an Internet Protocol (IP) packet, according to one embodiment.

FIG. 9B illustrates the flow of an Internet Protocol (IP) packet, according to one embodiment. FIG. 9B illustrates sending an IP packet from VM A 970 in Host 1 to VM B 972 in Host 2. The process is similar to the one described in FIG. 7, except that there is not a broadcast address but instead a unicast address, and the bridge tables in the DV filters already have the pertinent entries as VMs A and B have been running for a period of time.

Thus, encapsulated packet 956, leaving DV Filter 974, includes source and destination address associated with the IDs of hosts 1 and 2, respectively. When DV Filter 976 for VM B receives packet 958, it does not create a new entry in the bridge table because the entry for VM A already exists. Packet 958 is forwarded to VM B via the distributed switch and the VNIC port, as previously described.

It should be noted that packet 952 is an Ethernet frame and that the scenario described in FIG. 9 is for VMs that are executing in hosts with layer 2 connectivity. If the destination VM were in a host executing in a different LAN segment (i.e., a different data link layer segment), then MAC in MAC encapsulation would not work because the packet would be sent to a router in the network which may not be aware of the private networking scheme for fencing and would not work properly as the IP header is not where the router would expect it. In this case other fencing solutions for hosts on different networks can be combined with embodiments of the inventions. Solutions for internetwork fencing are described in U.S. patent application Ser. No. 12/571,224, filed Sep. 30, 2009, and entitled "PRIVATE ALLOCATED NETWORKS OVER SHARED COMMUNICATIONS INFRASTRUCTURE", which is incorporated herein by reference. Also, a VLAN network can be used to provide layer-2 connectivity to hosts in different networks.

Figure 10:
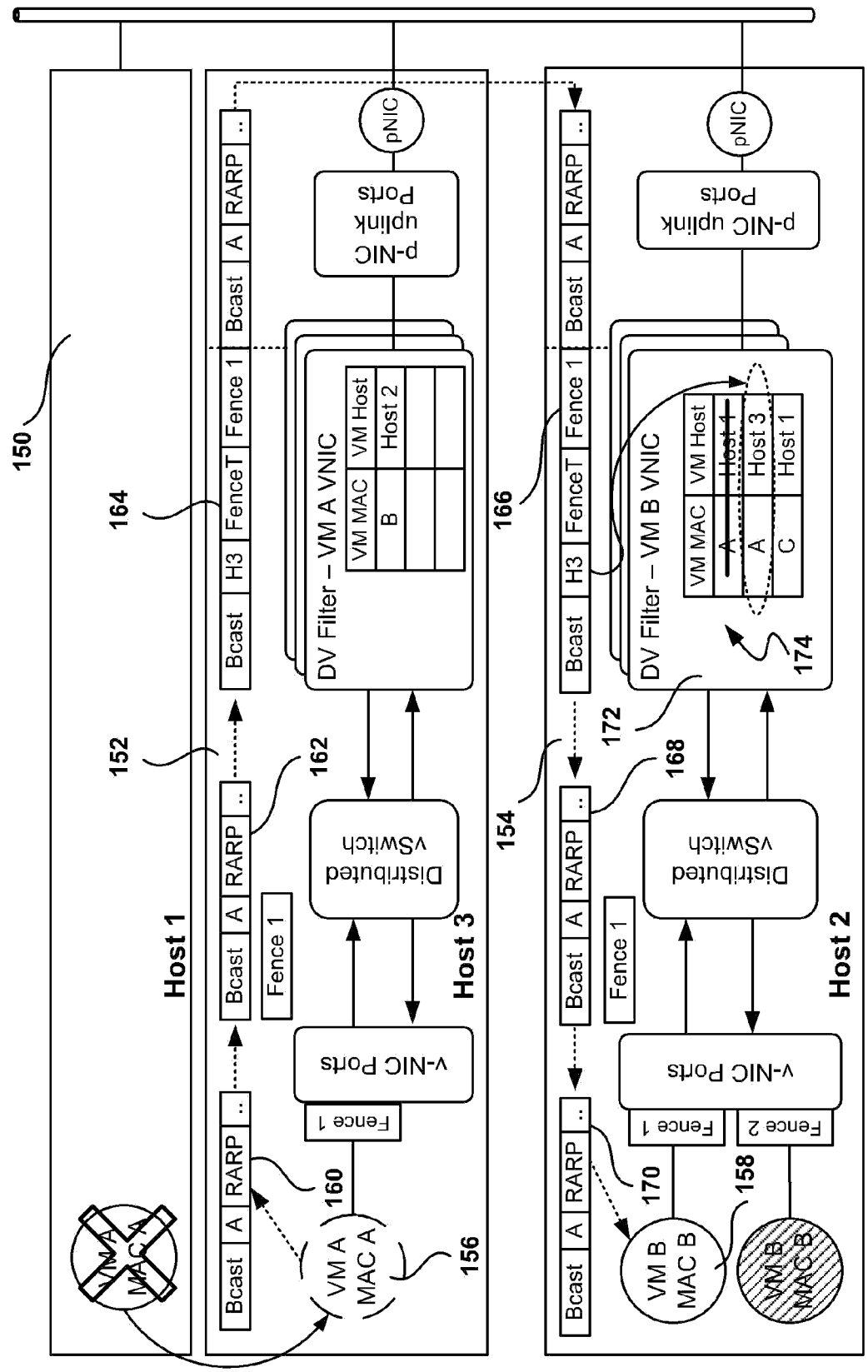
FIG. 10 illustrates the update of bridge tables when a VM migrates to a different host, according to one embodiment.

FIG. 10 illustrates the update of bridge tables when a VM migrates to a different host, according to one embodiment. When VM A 156 moves from Host 1 150 to Host 2 152, VM A 156 sends a Reverse Address Resolution Protocol (RARP) packet 160. RARP is a computer networking protocol used by a host computer to request its IP address from an administrative host, when the host computer has available its Link Layer or hardware address, such as a MAC address.

Since packet 160 is a broadcast packet, packet 160 will reach all nodes in the same private network as VM A 156. When packet 166 is received by DV Filter 172 in Host 2 154, DV Filter 172 detects that message is from VM A in Host 3. Since the bridge table entry for VM A has Host 1 as the host for VM A, and the new packet indicates that VM A is now executing in Host 3, the entry for VM A in bridge table 174 is updated to reflect this change. The packet is then delivered to VM B 158 because VM B is part of the private network in Fence 1 and this is a broadcast packet.

FIG. 11 shows the structure of an MTU configuration table, according to one embodiment. The MTU configuration table is used to store the MTU for each network. Thus, each entry (shown as columns in the table) includes a LAN identifier and a MTU for the corresponding LAN. When encapsulating a packet that results in a packet that is bigger than the MTU for that network, then the packet has to be fragmented. Each fragment is sent separately to the destination host with a different fragment sequence number. The DV filter at the destination will combine the fragments to reconstruct the original encapsulated packet.

As previously described, a way to avoid fragmentation is by reducing the MTU in the network configuration of the host. For example, if the MTU of a network is 1,500, the network can be configured in the VM as having an MTU of 1,336, reserving 144 bits for the encapsulation by the DV Filter.

FIG. 12 shows one embodiment of an active-ports table. The active-ports table has one entry (in each row) for each active VNIC and includes an OPI field, a LAN ID, and the MTU. The OPI includes virtual lab server parameters "installation ID" and "fence ID". The installation ID identifies a particular implementation of a fenced configuration, and different clones will have different fence IDs. The fence ID identifies the fence ID associated with the VNIC. The LAN ID is an internal identifier of the underlying network that the private network (fence) overlays. Different fences may share the underlying LAN. The MTU indicates the maximum transmission unit on the network.

FIG. 13 shows an embodiment of a bridge table. As previously described, the bridge table resides in the DV filter and is used to keep the address of the destination hosts where the VMs of the private network are executing. The network is organized by VNIC, also referred to as ports, each associated with the VNIC for a VM. The example shown in FIG. 13 includes entries for 3 ports, 0x4100b9f869e0, 0x4100b9f86d40, and 0x4100b9f86f30. Port 0x4100b9f869e0 has no entries in the bridge table yet, and the other two ports have 4 entries. Each of these entries includes an inner MAC address, an outer MAC address, a "used" flag, an "age" value, and a "seen" flag.

The inner MAC address corresponds to the Ethernet of another VM in the same private network. The outer MAC address corresponds to the Ethernet of the host that the VM is on and includes the address that would be added in an encapsulating header to send a message to the corresponding VM. Of course, the address may be constructed as described in reference to FIG. 6. For example, the entry in DV filter 746 of FIG. 7 holds the inner MAC address of VM A, and the outer MAC address for Host 1. The used flag indicates if the entry is being used, the age flag indicates if the entry has been updated in a predetermined period of time, and the seen flag indicates if the entry has been used recently.

The tables in FIGS. 11-13 are interrelated. For example, the second entry in active ports table of FIG. 2 is for port 0x4100b9f86d40. The OPI is "3e,0000fb", which means that the installation ID is 3e and the fence ID is 0000fb. In the bridge table of FIG. 13, it can be observed that outer MAC addresses for port 0x4100b9f86d40 have the same OUI (00: 13:f5), and the same installation ID (3e). The remainder of the outer MAC address corresponds host IDs for different hosts (02:c2, 02:e2, 03:02, and 02:f2).

Figure 14:
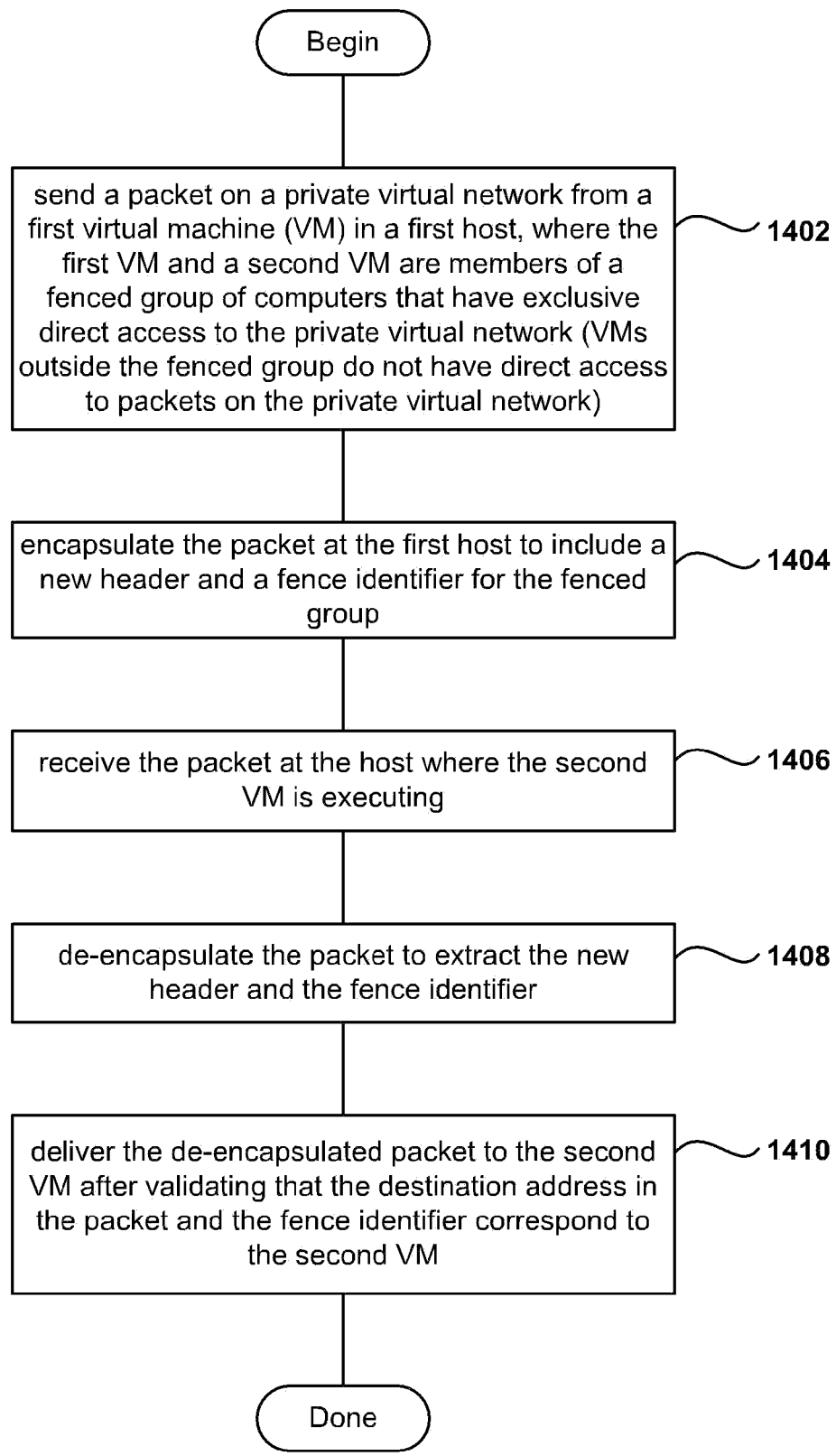
FIG. 14 shows the process flow of a method for private networking within a virtual infrastructure, in accordance with one embodiment of the invention.

FIG. 14 shows the process flow of a method for private networking within a virtual infrastructure, in accordance with one embodiment of the invention. The process includes operation 1402 for sending a packet on a private virtual network from a first VM in a first host. The first VM and a second VM are members of a fenced group of computers that have exclusive direct access to the private virtual network, such that VMs outside the fenced group do not have direct access to packets on the private virtual network. From operation 1402, the method flows to operation 1404 for encapsulating the packet at the first host to include a new header and a fence identifier for the fenced group. See for example DV filter 724 of FIG. 7.

The packet is received at a host where the second VM is executing, in operation 1406, and the method continues in operation 1408 for de-encapsulating the packet to extract the new header and the fence identifier. In operation 1410, the de-encapsulated packet is delivered to the second VM after validating that the destination address in the packet and the fence identifier correspond to the address of the second VM and the fence identifier of the second VM.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for private networking within a virtual infrastructure, the method comprising:
    sending a packet on a private virtual network from a first virtual network interface card (VNIC) associated with a first virtual machine (VM) in a first host, the first VNIC and a second VNIC being members of a fenced group that have exclusive direct access to the private virtual network, wherein the second VNIC is associated with a second VM, wherein VNICs outside the fenced group do not have direct access to packets on the private virtual network, and wherein the first VM is associated with a third VNIC, and the third VNIC is a member of a second fenced group;
    encapsulating the packet at the first host to include a new header and a fence identifier for the fenced group;
    receiving the packet at a second host where the second VM is executing;
    de-encapsulating the packet to extract the new header and the fence identifier; and
    delivering the de-encapsulated packet to the second VNIC after validating that a destination address in the packet and the fence identifier correspond to the second VNIC.

2. The computer implemented method as recited in claim 1, wherein the new header includes a new source address and a new destination address having a fence organizationally-unique-identifier (OUI), an installation identifier, and a host identifier.

3. The computer implemented method as recited in claim 2, wherein the fence OUI is dedicated for private virtual networking and is manufacturer independent.

4. The computer implemented method as recited in claim 1, further including:
    sending a broadcast packet on the private network; and
    forwarding the broadcast packet to hosts with VNICs in the fenced group that are connected to the private virtual network.

5. The computer implemented method as recited in claim 4, further including:
    updating a bridge table in each host to identify which host is associated with a VNIC that sent the broadcast packet if an update to the bridge table is needed; and
    delivering the broadcast packet to VNICs in the fenced group connected to the virtual private network.

6. The computer implemented method as recited in claim 5, wherein entries in the bridge table include:
    a VNIC identifier;
    a private network address; and
    an outer MAC address that includes a fence OUI, an installation ID, and a host ID.

7. The computer implemented method as recited in claim 6, further including sending the packet via unicast delivery to the second host where the second VM associated with the second VNIC is executing after the encapsulating, wherein a location of the second VNIC is determined by consulting the bridge table.

8. The computer implemented method as recited in claim 6, further including:
    moving the first VM to a third host; and
    updating the bridge tables in each host where VMs in the fenced group are executing.

9. The computer implemented method as recited in claim 1, wherein the first host and the second host are attached to a shared Ethernet network, wherein the private virtual network provides link layer isolation to the fenced group.

10. The computer implemented method as recited in claim 1, wherein the first host is a same host as the second host.

11. The computer implemented method as recited in claim 1, wherein the first host is a different host from the second host.

12. The computer implemented method as recited in claim 1, wherein a VNIC cannot be a member of more than one fenced group.

13. The computer implemented method as recited in claim 12, wherein each VNIC is associated with one layer 2 and one layer 3 address.

14. A computer program embedded in a non-transitory computer-readable storage medium, when executed by one or more processors, for private networking within a virtual infrastructure, the computer program comprising:
    program instructions for sending a packet on a private virtual network from a first virtual network interface card associated with a first virtual machine (VM) in a first host, the first VNIC and a second VNIC being members of a fenced group that have exclusive direct access to the private virtual network, wherein the second VNIC is associated with a second VM, wherein VNICs outside the fenced group do not have direct access to packets on the private virtual network, and wherein the first VM is associated with a third VNIC, and the third VNIC is a member of a second fenced group;
    program instructions for encapsulating the packet at the first host to include a new header and a fence identifier for the fenced group;

program instructions for receiving the packet at a second host where the second VM is executing;

program instructions for de-encapsulating the packet to extract the new header and the fence identifier; and program instructions for delivering the de-encapsulated packet to the second VNIC after validating that a destination address in the packet and the fence identifier correspond to the second VNIC.

15. The computer program as recited in claim 14, further including:

program instructions for fragmenting segmenting the encapsulated packet if the encapsulated packet is bigger than a maximum transmission unit (MTU) of an underlying physical network, the fragmenting being transparent to; and program instructions for assembling the fragmented encapsulated packet at the second host where the second VM is executing.

16. The computer program as recited in claim 14, wherein switches and routers in a physical network connected to the first host do not hold information regarding the virtual private network.

17. The computer program as recited in claim 14, wherein a packet sent to a VNIC in the fenced group is dropped if the packet sent comes from a port corresponding to a VNIC that is not in the fenced group.

18. The computer program as recited in claim 14, wherein an implementation of the virtual private network is transparent to an operating system executing in the first VM.

\* \* \* \* \*